US010377251B2

(12) United States Patent
McGrath et al.

(10) Patent No.: US 10,377,251 B2
(45) Date of Patent: Aug. 13, 2019

(54) ELECTRIC VEHICLE CHARGING INTERFACE

(71) Applicant: Proterra Inc., Greenville, SC (US)

(72) Inventors: Seamus McGrath, Simpsonville, SC (US); Samuel Shartzer, Greenville, SC (US); Neeraj Chirmulay, Greenville, SC (US); Gordon Dollar, Simpsonville, SC (US); Keyur Shah, Greenville, SC (US)

(73) Assignee: Proterra Inc., Burlingame, CA (US)

( * ) Notice: Subject to any disclaimer, the term of this patent is extended or adjusted under 35 U.S.C. 154(b) by 0 days.

(21) Appl. No.: 14/670,027

(22) Filed: Mar. 26, 2015

(65) Prior Publication Data

US 2016/0280084 A1 Sep. 29, 2016

(51) Int. Cl.
*H02J 7/00* (2006.01)
*B60L 11/18* (2006.01)
*B60L 5/02* (2006.01)
*B60L 5/42* (2006.01)
*B60M 1/36* (2006.01)
*B60L 53/14* (2019.01)
*B60L 53/30* (2019.01)

(52) U.S. Cl.
CPC ........... *B60L 11/1816* (2013.01); *B60L 5/02* (2013.01); *B60L 5/42* (2013.01); *B60L 53/14* (2019.02); *B60L 53/32* (2019.02); *B60M 1/36* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
None
See application file for complete search history.

(56) References Cited

U.S. PATENT DOCUMENTS

| | | | |
|---|---|---|---|
| 5,291,388 A | 3/1994 | Heinrich | |
| 5,293,947 A | 3/1994 | Stratton | |
| 5,341,083 A * | 8/1994 | Klontz | B60L 11/1816 320/109 |
| 5,365,153 A | 11/1994 | Fujita et al. | |
| 5,504,414 A | 4/1996 | Kinoshita | |
| 5,867,000 A * | 2/1999 | Thornton | 318/434 |
| 6,023,137 A | 2/2000 | Kumar et al. | |
| 6,281,649 B1 * | 8/2001 | Ouellette et al. | 318/443 |
| 7,185,591 B2 | 3/2007 | Kumar et al. | |
| 7,690,456 B2 | 4/2010 | Deng et al. | |

(Continued)

FOREIGN PATENT DOCUMENTS

| | | |
|---|---|---|
| WO | WO/2011/079215 | 6/2011 |
| WO | WO/2011121052 | 10/2011 |
| WO | WO/2011/139675 | 11/2011 |

*Primary Examiner* — Samuel Bernhanu
(74) *Attorney, Agent, or Firm* — Bookoff McAndrews, PLLC

(57) ABSTRACT

An electric vehicle charging system includes a charging interface positioned on an external surface of the electric vehicle and one or more electrodes positioned on the charging interface. The charging system may also include a heating system positioned on the charging interface. The heating system may be configured to heat at least a portion of the charging interface. The charging system may also include a control system configured to selectively activate the heating system based at least on one or more ambient conditions.

19 Claims, 9 Drawing Sheets

(56) References Cited

U.S. PATENT DOCUMENTS

| | | | |
|---|---|---|---|
| 7,733,039 B2 | 6/2010 | Su | |
| 7,921,502 B1* | 4/2011 | Valverde | B60S 1/66 15/246 |
| 7,960,857 B2 | 6/2011 | King | |
| 8,008,876 B2 | 8/2011 | Yonemori et al. | |
| 8,030,884 B2 | 10/2011 | King et al. | |
| 8,324,858 B2 | 12/2012 | Pelton | |
| 8,453,773 B2 | 6/2013 | Phan | |
| 8,921,739 B2* | 12/2014 | Petrenko | H05B 3/84 219/203 |
| 9,260,025 B1* | 2/2016 | McGrath | B60L 11/1816 |
| 2006/0250902 A1 | 11/2006 | Bender et al. | |
| 2008/0042621 A1* | 2/2008 | Miglioranza | H02J 7/1407 320/150 |
| 2009/0021221 A1* | 1/2009 | Krauer | B60L 11/1875 320/153 |
| 2009/0243538 A1* | 10/2009 | Kelty | B60L 11/1851 320/104 |
| 2010/0013438 A1 | 1/2010 | Anwar et al. | |
| 2010/0025131 A1 | 2/2010 | Gloceri et al. | |
| 2010/0225258 A1 | 9/2010 | Namuduri et al. | |
| 2011/0031051 A1 | 2/2011 | George | |
| 2011/0089887 A1 | 4/2011 | Ward | |
| 2011/0100735 A1 | 5/2011 | Flett | |
| 2011/0198141 A1 | 8/2011 | Clark et al. | |
| 2011/0199047 A1* | 8/2011 | Fujii | B60L 1/04 320/109 |
| 2012/0061482 A1* | 3/2012 | Stothers | H05B 1/0236 237/2 R |
| 2013/0181679 A1 | 7/2013 | Naylor | |
| 2013/0193918 A1 | 8/2013 | Boateng | |
| 2013/0221918 A1* | 8/2013 | Hill | B60L 11/1837 320/109 |
| 2014/0070767 A1* | 3/2014 | Morris | B60L 5/42 320/109 |
| 2015/0054462 A1* | 2/2015 | Weidinger | B60L 3/04 320/109 |
| 2015/0151644 A1* | 6/2015 | Nakajima | B60K 1/04 320/109 |

* cited by examiner

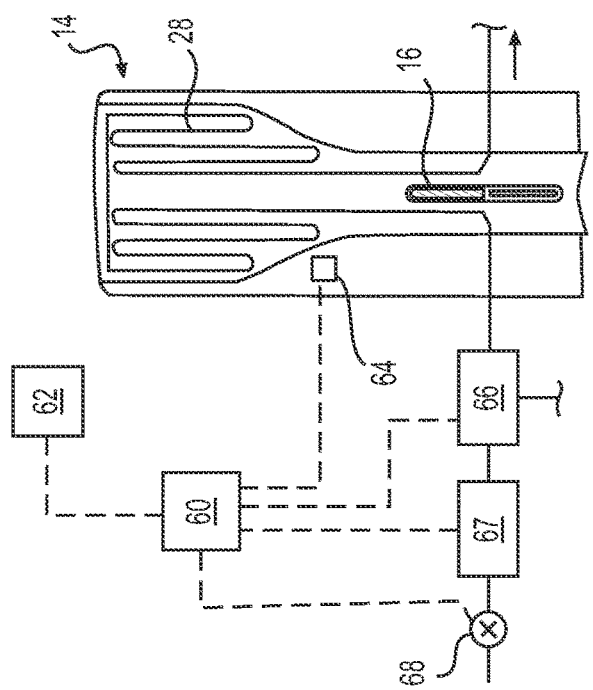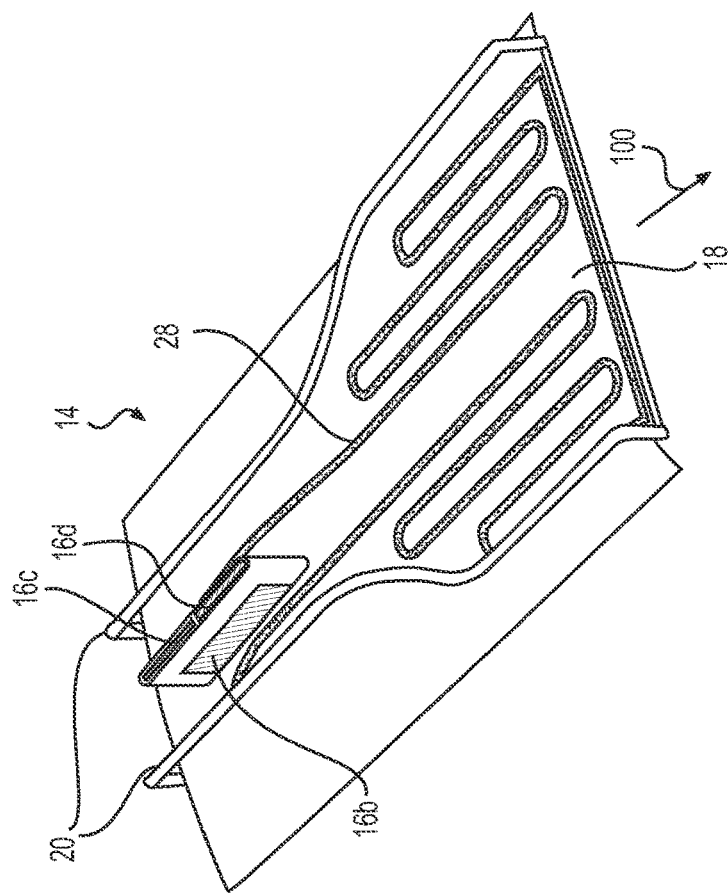
FIG. 3B
FIG. 3A

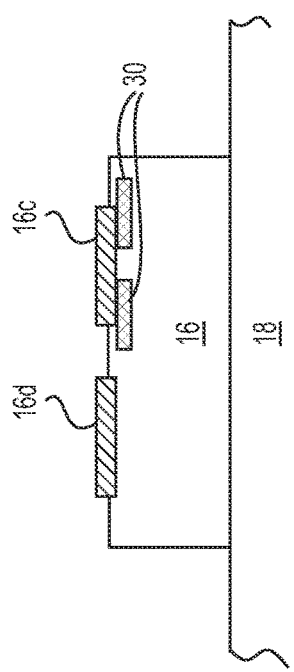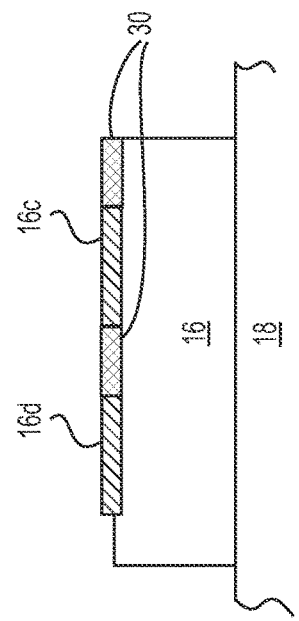

ELECTRIC VEHICLE CHARGING INTERFACE

BACKGROUND

A heavy duty battery powered electric vehicle (EV) may require relatively frequent charging at charging stations to provide power for operation. During charging, energy storage systems (such as, batteries) in the EV store power. This stored power enables the EV to operate until the next charging. Traditionally, charging an EV required the driver to park and connect high voltage cables from the charger to a charging port in the vehicle. Such a charging method may be time intensive and may not be suitable for some applications. To minimize the time required for charging, charging stations may be provided along a route, and an EV may dock with and charge its batteries periodically during its normal operation. During docking, electrodes on the EV electrically connect with electrodes of the charging station to transfer power to the batteries of the EV.

In some operating conditions, dust, snow, and ice particles (debris) may accumulate on the electrodes of the EV during operation. These accumulated particles may detrimentally affect the formation of a good electrical contact between the EV and the charging station and thus hinder charging. Embodiments of the current disclosure may alleviate the problems discussed above and/or other problems in the art. The scope of the current disclosure, however, is defined by the attached claims, and not by the ability to solve any specific problem.

SUMMARY

In one embodiment, an electric vehicle charging system is disclosed. The charging system includes a charging interface positioned on an external surface of the electric vehicle and one or more electrodes positioned on the charging interface. The charging system may also include a heating system positioned on the charging interface. The heating system may be configured to heat at least a portion of the charging interface. The charging system may also include a control system configured to selectively activate the heating system based at least on one or more ambient conditions.

In another embodiment, a method of operating an electric vehicle is disclosed. The electric vehicle may include a charging interface with a heating system. The method may include monitoring an ambient temperature, and activating the heating system to heat at least a portion of the charging interface when the monitored ambient temperature is below a threshold value.

In yet another embodiment, an electric bus is disclosed. The bus may include a body having a roof, and a charging interface positioned on the roof. The bus may also include a heating system positioned on the charging interface. The heating system may be configured to heat at least a portion of the charging interface. The bus may also include a control system configured to selectively activate the heating system based at least on one or more ambient conditions.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3A is an illustration of an exemplary charging interface with a heating mechanism;

FIG. 3B is an illustration of an exemplary control system of the charging interface of FIG. 3A;

FIGS. 5A and 5B are illustrations of exemplary heating mechanisms of the charging interface.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention.

Figure 1:
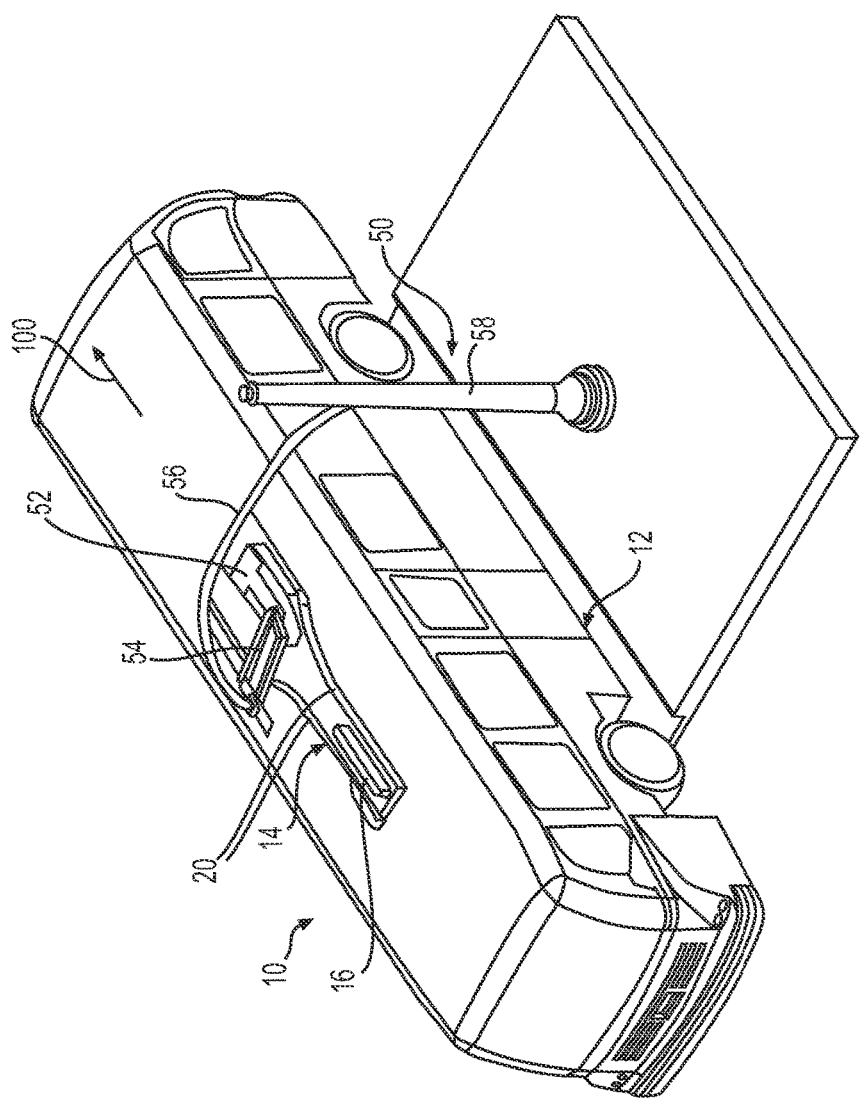
FIG. 1 shows an exemplary bus engaging with an exemplary charging station.

FIG. 1 illustrates an electric vehicle in the form of an electric bus 10 engaging with a charging station 50. Although an electric bus is used as an exemplary electric vehicle in this disclosure, the current disclosure is applicable to any electric vehicle (car, truck, train, etc.) without limitation. Electric bus 10 may include a body enclosing a space for passengers. In some embodiments, some (or all) parts of body may be fabricated using one or more composite materials to reduce the weight of bus 10. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches (30.5-40.6 cm) from the road surface. In this disclosure, the term "about" is used to indicate a possible variation of ±10% in a stated numeric value.

Bus 10 may include an electric powertrain (not shown) with an electric motor powered by one or more batteries 12 positioned on the bus. The batteries 12 may store electrical energy to power the motor, and in some embodiments, may be positioned under the floor of the bus 10. The batteries 12 may have any chemistry and construction. In some embodiments, the batteries 12 may include lithium titanate batteries. It is also contemplated that, in some embodiments, the batteries 12 may include multiple different chemistries (for example, lithium titanate, lead-acid, nickel cadmium, nickel metal hydride, lithium ion, zinc air, etc.) and may be positioned at different locations on the bus 10. Some possible battery arrangements in bus 10 are described in commonly assigned U.S. Pat. No. 8,453,773 which is incorporated herein by reference in its entirety. In some embodiments, the battery architecture of bus 10 may be configured to enable fast charging of the batteries 12.

The charging station 50 may be positioned on a route of travel of bus 10, and may include an overhanging vehicle charging head 52. The charging head 52 may be attached to a pole 58 fixed to the ground. The charging station 50 may electrically couple an electrical power supply (power grid, external energy storage unit, etc.) to the charging head 52. The charging head 52 may be adapted to interface with and charge the batteries 12 of the bus 10 during a charging event. Details of the charge head 52 and the interfacing of the charge head 52 with a charging interface 14 on bus 10 are described in commonly assigned patent applications US 2013/0193918 A1 and US 2014/0070767 A1, which are incorporated by reference in their entirety herein.

Figure 2:
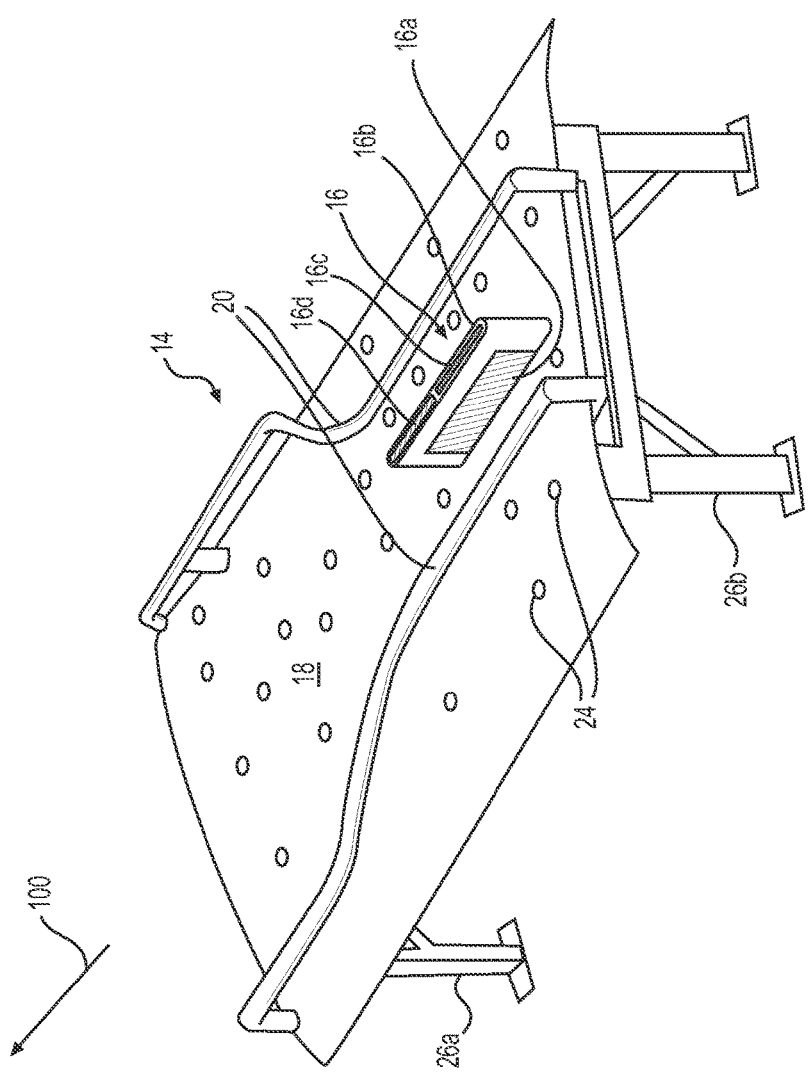
FIG. 2 is an illustration of an exemplary charging interface of the bus of FIG. 1.

The charging interface 14 may be provided on the roof of the bus 10 to interface with the charging head 52 of the charging station 50. FIG. 2 illustrates an enlarged view of the charging interface 14. In the description below, reference will be made to both FIGS. 1 and 2. Charging interface 14 may include a charging blade 16 and an alignment scoop 20 mounted on a landing surface 18. As the bus 10 pulls up under a charging station 50 and moves in the direction of arrow 100, the charging head 52 of the charging station 50 may land on the landing surface 18 and move towards the charging blade 16. The alignment scoop 20 may include opposing curved rails that act as a funnel to direct the charging head 52 towards the charging blade 16. The converging shape of the alignment scoop 20, and the play of the charging head 52, accommodates misalignment of the bus 10 with the charging head 52, and enables the charging head 52 to repeatably interface with the charging interface 14. Thus, the alignment scoop 20 serves as an alignment feature that assists in repeatable engagement of the charging head 52 with the charging interface 14.

The charging blade 16 may protrude vertically upwards from the landing surface 18 and may house one or more electrodes electrically separated by an insulating material. These electrodes may include first and second electrodes 16a, 16b positioned on either side of the charging blade 16 and connected to opposite poles of batteries 12. When the charging head 52 mates with the charging blade 16, electrodes in the charging head 52 mate with the first and second electrodes 16a, 16b and transfer power to the batteries 12. The electrodes may also include a pilot electrode 16c and a ground electrode 16d positioned on the top surface of charging blade 16. When the charging head 52 properly mates with charging blade 16, detection of electrical contact between the pilot electrode 16c and a mating electrode on the charging head 52 may initiate charging. Charging of the bus 10 may not be initiated unless good contact of the pilot electrode 16c with the mating electrode is detected. The ground electrode 16d may contact a ground terminal of the charging head 52 and may be connected to a common ground.

Although the charging interface 14 is described as being positioned on the roof of the bus 10, and the charging head 52 is described as being suspended above bus 10, this is not a requirement. In general, the charging interface 14 may be positioned anywhere on the bus 10 (such as, for example, a side surface of the bus 10), and the charging head may be positioned to mate with the charging interface. Embodiments of charging interfaces 14 and charging stations 50 that may be used for bus 10 are described in commonly-assigned International Applications PCT/US2010/061862 (Publication No. WO/2011/079215) filed on Dec. 22, 2010 and PCT/US2011/033903 (Publication NO. WO/2011/139675) filed on Apr. 26 2011, which are incorporated by reference in their entirety herein. Further, although charging blade 16 is described as projecting upwards from landing surface 18, and the electrodes (16a, 16b, 16c, 16d) are described as being positioned on specific surfaces of the charging blade 16, this is not a requirement. In general, the charging blade 16 and the electrodes (16a, 16b, 16c, 16d) may have any configuration. For example, in some embodiments, the charging blade 16 may be a flat surface with the electrodes positioned thereon.

Accumulated debris (such as, dust, snow, ice, etc.) on the charging interface 14 (such as on landing surface 18 and/or on the electrodes 16a, 16b, 16c, 16d) may interfere with the formation of good electrical contact between the charging interface 14 and the charging head 52. For example, debris on the pilot electrode 16c may prevent (or delay) the detection of electrical contact between the charging interface 14 and the charging head 52, and thus prevent (or delay) the initiation of charging. The charging head 52 may include features adapted to minimize the impact of the debris on charging.

In some embodiments, as illustrated in FIG. 2, the landing surface 18 may be curved (for example, a convex surface on the roof of the bus) over its entire surface, or at its edges. A curved landing surface 18 may enable debris to slide off the landing surface 18 and thereby decrease its accumulation on the landing surface 18. In some embodiments, the landing surface 18 may be inclined to enable debris to slide off the landing surface 18. For example, the charging interface 14 may be attached to the roof of bus 10 using standoffs 26a at the front and standoffs 26b at the back. In embodiments where the front standoffs 26a are shorter than the back standoffs 26b, the landing surface 18 will be inclined down towards the front. In such an embodiment, wind that blows over the landing surface 18 as the bus 10 moves may assist in blowing the debris off.

Additionally or alternatively, in some embodiments, the opposing curved rails that form the alignment scoop 20 may be formed of bars that are attached to the landing surface at selected locations (such as, opposite ends). In such an embodiment, the alignment scoop 20 is vertically spaced apart from the landing surface 18 to provide a vertical gap that enables accumulated debris to be blown off the landing surface 18. In some embodiments, the landing surface 18 may include slots 24 or grooves (not shown) to enable the debris to pass therethrough, and thus reduce its accumulation on the landing surface 18. In some embodiments, the charging interface 14 may include one or more air jets (not shown) configured to blow debris off the landing surface 18 and/or the charging blade 16. In some embodiments, these air jets may be positioned proximate the charging blade 16 and configured to blow debris off of one or more of the electrodes (16a, 16b, 16c, 16d) of the charging blade 16.

In some embodiments, selected surfaces of the charging interface 14 may be heated to melt accumulated snow and ice (collectively referred to herein as "ice") prior to interfacing with the charging head 52. FIG. 3A illustrates an embodiment of the charging interface 14 that includes fluid piping 28 to circulate a heated fluid through the charging interface 14. Any heated fluid (air, liquid) may be circulated through the piping 28. In some embodiments, a liquid coolant that is used to cool heated components of the bus 10 (such as, HVAC system, electric motor, brakes, etc.) may be circulated through the piping 28 to heat the charging interface 14. The piping 28 may serve as a radiator and waste heat of the bus 10 may be used to heat the charging interface 14. In some embodiments, the piping 28 may serve as the primary radiator of the bus 10, while in other embodiments, the piping 28 may serve as an auxiliary radiator. Alternatively, in some embodiments, the liquid coolant that passes through piping 28 may be heated in a heat exchanger using waste heat of bus 10. That is, a heated liquid that removes waste heat from the bus 10 may transfer its heat to the coolant that circulates through piping 28, at a heat exchanger.

The piping 28 may be arranged in any manner in the charging interface 14. In some embodiments, the piping 28 may arranged to heat selected areas of the charging interface 14, while in other embodiments, the piping 28 may be configured to heat substantially the entire charging interface 14. In the embodiment illustrated in FIG. 3A, the piping 28 is arranged to heat the landing surface 18 between the alignment scoops 20. In some embodiments, the piping 28 may be arranged to selectively heat the area of the landing surface 18 proximate the charging blade 16. It is also contemplated that, in some embodiments, the piping 28 may be routed through the charging blade 16 to selectively heat one or more electrodes (for example, the pilot electrode 16c, see FIG. 2) of the charging blade 16.

The piping 28 may be attached to the landing surface 18 or embedded in the landing surface 28. In some embodiments, a pump may circulate the fluid through the piping 28. The pump may direct the heated fluid through the piping 28 to transfer heat to the charging interface 14. The heat may melt any accumulated ice on the charging interface 14. After dissipating the heat, the cooled fluid may be directed to the heat exchanger or routed through other heated components of the bus 10 to pick up heat.

In some embodiments, as illustrated in FIG. 3B, a control system 60 may control the flow of the fluid through the piping 28 to regulate heating of the charging interface 14. In some embodiments, the control system 60 may control the flow of fluid and/or the temperature of the fluid through the piping 28 based on environmental or ambient conditions (temperature, freezing conditions, etc.) In some embodiments, sensors (such as, for example, humidity sensor 64, temperature sensor 62, etc.) on the bus 10 may indicate the presence of ice on the charging interface 14. Based on this information, the control system may initiate (or regulate) the flow of heated fluid through the piping 28. In some embodiments, the control system may also control the temperature and/or flow rate of the heated fluid flowing through the piping 28. Controlling the temperature of the fluid may including lowering the temperature of the coolant directed to the piping 28 by mixing the heated coolant with a cooler fluid in mixer 66. In some embodiments, the control system may increase the temperature of the coolant flowing through the piping 28 by heating the fluid using a supplemental heater 67. The control system may regulate the flow rate of the fluid through the piping 28 using a valve 68 positioned on the flow path.

Alternatively or additionally, the charging interface 14 may be heated using resistive heaters. FIG. 4A illustrates an embodiment of the charging interface 14 with electric heating elements 30 on the landing surface 18. The heating elements 30 may include electrically resistive heating elements embedded on, attached to, or adhered to, the landing surface 18. The heating elements 30 may be formed substantially on an entire area of the landing surface 18 or it may be provided in, or concentrated in, selected areas of the landing surface 18 (such as, for example, proximate the charging blade 16). The heating elements 30 may be electrically coupled to the batteries 12 or another source of electrical energy. In some embodiments, a single heating element 30 may extend over the entire landing surface 18, while in other embodiments, multiple heating elements 30 may extend over different portions of the landing surface 18.

Figure 4B:
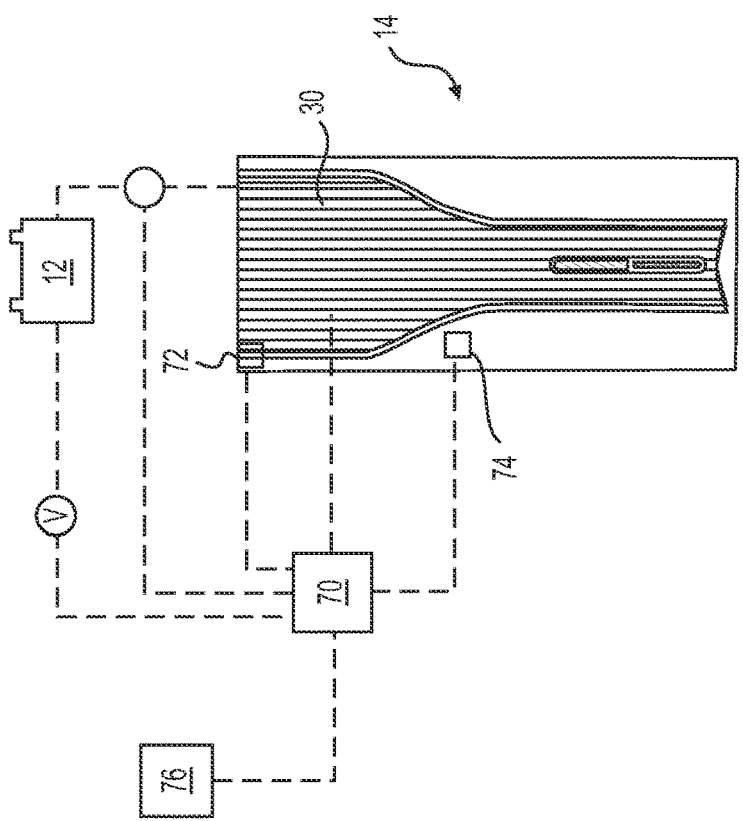
FIG. 4B is an illustration of an exemplary control system of the charging interface of FIG. 4A.
Figure 4A:
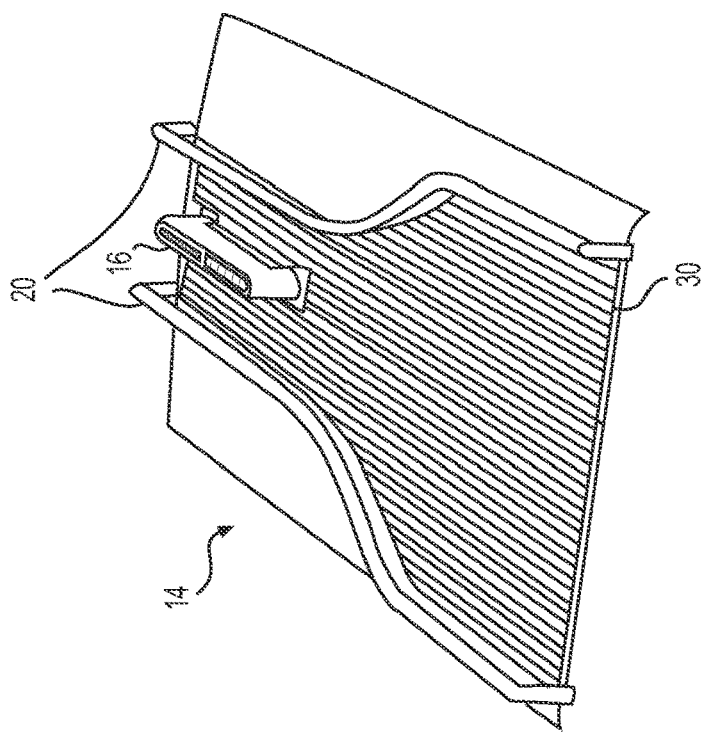
FIG. 4A is an illustration of an exemplary charging interface with a heating mechanism.

In some embodiments, as illustrated in FIG. 4B, a control system 70 may control the heating of the heating elements 30. As discussed with reference to control system 60 of FIG. 3B, control system 70 may also control the heating elements 30 (power, etc.) based on environmental or ambient conditions. In some embodiments, the operating conditions of the bus may also be used to control the heating elements 30. For instance, the control system 70 may detect the presence of ice on the charging interface 14 and activate the heating elements when ice is present. Detecting the presence of ice may be achieved in any manner. In some embodiments, a charging station or another remote facility (weather bureau, transit bureau, etc.) may transmit weather related information (freezing conditions, snowfall, etc.) to the bus 10, and based at least partly on this information, the control system 70 may control the heating elements 30. In some embodiments, the operator of the bus 10 may activate and/or control the power directed to the heating elements 30 based on observed environmental conditions. It is also contemplated that, in some embodiments, the heating elements 30 may be activated by a source external to the bus 10 (e.g., charging station). For instance, when a bus 10 approaches a charging station, based on the ambient temperature, the charging station may activate the heating elements 30 (or instruct control system 70 to activate the heating elements 30).

In some embodiments, the control system 70 may detect the presence of ice on the charging interface 14 based on the performance of the heating elements 30. For example, in some embodiments, based on the temperature rise of the charging interface 14 and the energy expended in heating the charging interface 14, the control system 70 may detect the presence of accumulated ice on the charging interface 14. A temperature sensor 72 coupled to (or otherwise associated with) the charging interface 14 may indicate the temperature of the charging interface 14. The control system 70 may determine the energy directed to the heating elements 30 in any manner. In some embodiments, a current transducer may indicate the amount of current flowing to the heating elements 30 from the batteries 12. The control system 70 may then compute the power directed to the heating elements 30 by multiplying the voltage of batteries 12 with the detected current. The energy consumed by the heating elements 30 may then be determined by integrating the power over time. This consumed energy is converted to heat by the heating elements 30. A portion of the heat generated by the heating elements 30 is lost as heat loss to the environment. The remaining portion of the generated heat is used to raise the temperature of the charging interface 14 and the accumulated ice (if any). If phase change of the ice occurs (or water or steam), a portion of the generated heat is also used for the phase change (latent heat of fusion, latent heat of vaporization, etc.). If there is ice on the charging interface 14, the amount of energy needed to raise the temperature of the charging interface 14 will be more than that needed in the absence of ice. This required energy further increases with the quantity of the accumulated ice.

Figure 4C:
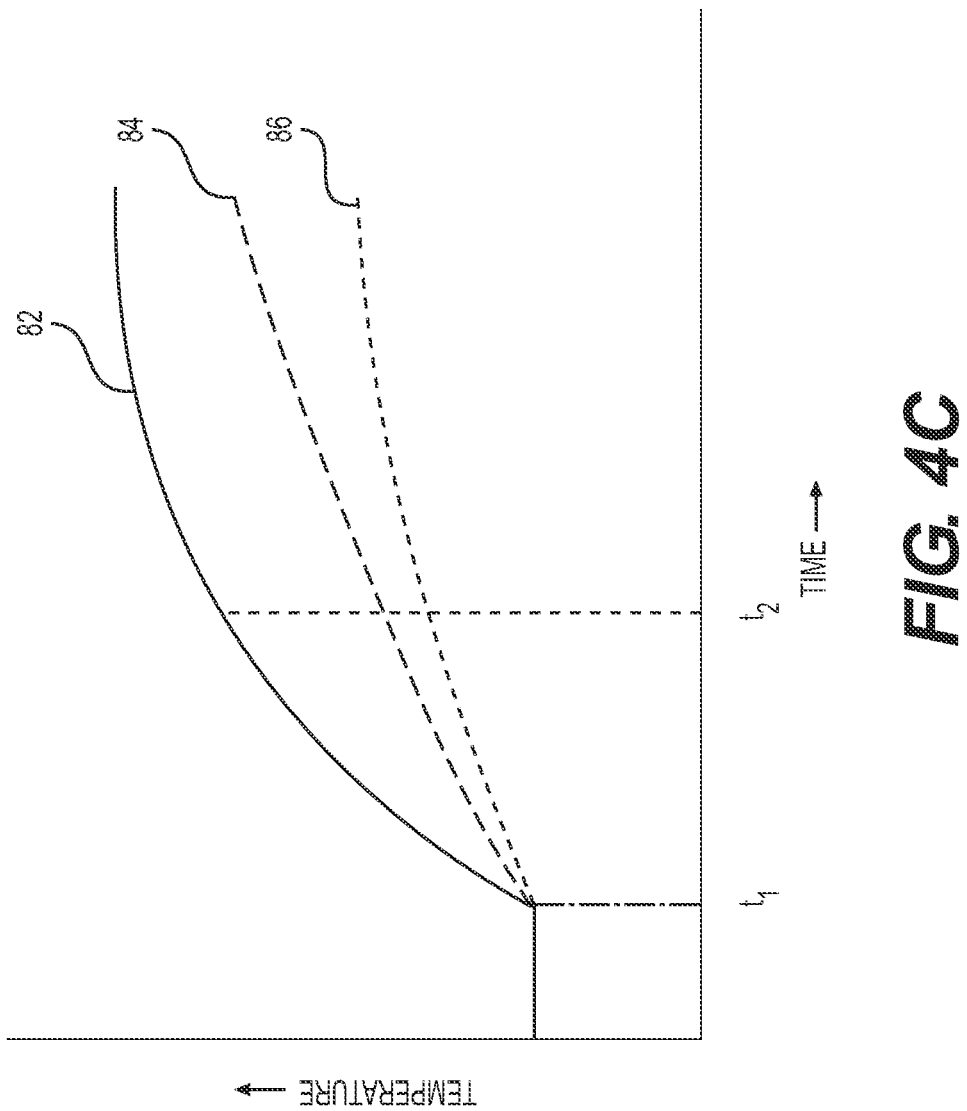
FIG. 4C is an illustration of the measured temperature of the charging interface over time.

FIG. 4C schematically illustrates the temperature of the charging interface 14 over time. After the heating elements 30 are activated at time $t_1$, the temperature of the charging interface 14 increases with time. Curve 82 indicates the temperature increase of the charging interface 14 as a function of time in the absence of ice, curve 84 indicates the temperature increase when accumulated ice is present on the charging interface 14, and curve 86 indicates the temperature increase in the presence of a larger quantity of accumulated ice. As indicated in FIG. 4C, for the same amount of energy directed to the heating elements 30, the rate of temperature increase of the charging interface 14 is lower in the presence of ice. In some embodiments, the control system 70 may detect the presence of accumulated ice in the charging interface 14 based on its rate of temperature increase. In some embodiments, the control system 70 may detect the presence of accumulated ice based on the absolute temperature of the charging interface 14 after a set time of heater activation. Based on historical or experimental data, the expected threshold rates of temperature change (or temperature after different times) of the charging interface 14 at different energy levels and different accumulated ice quantities may be preprogrammed into the control system 70.

In some embodiments, the control system 70 may predict the rate of change of temperature of the charging interface 14 based on a thermal model. The control system 70 may include a thermal model of a dry charging interface 14. This model may estimate the temperature of the charging interface 14 by calculating the estimated heat loss to the environment (using ambient temperature) and the energy being consumed by the heating elements 30 (i.e., battery voltage multiplied by current transducer feedback). The model predicted temperature may then be compared to the measured temperature of the charging interface 14 to determine if there is ice accumulation. If the predicted temperature exceeds the measured temperature by a preset value, the control system 70 determines that ice is present in the charging interface 14.

In some embodiments, the control system 70 may detect the presence of ice on the charging interface 14 based on a weight of the charging interface 14. Charging interface 14 may include a sensor (not shown) that detects the weight of the charging interface 14 (or a component of the charging interface). In such embodiments, the control system 70 may detect the presence of ice on the charging interface 14 when the measured weight exceeds a predetermined threshold value. Based on the detection of ice accumulation, the control system 70 may minimize energy consumption of the heating elements 30.

In some embodiments, the control system 70 may activate heating elements 30 when the ambient temperature is below a predetermined threshold value (or upon the occurrence of another triggering event). The control system 70 may then check to determine if ice is present on the charging interface 14 (for e.g., based on the measured rate of temperature increase of the charging interface 14, weight of the charging interface 14, etc.). If ice is not present, the control system 70 may deactivate the heating elements 30. If ice is present, the heating may be continued. In some embodiments, the heating may be continued for a predetermined time if ice is detected on the charging interface 14. The predetermined time may be the time needed to melt the ice at a selected energy level. In some embodiments, the control system 70 may monitor the temperature of the charging interface 14 (or its weight) to detect melting of the ice, and continue heating of the charging interface 14 until the accumulate ice has melted to below a selected value.

With reference to FIG. 4B, in some embodiments, the control system 70 (or control system 60 of FIG. 3B) may determine the likelihood of ice accumulation on the charging interface 14 based on ambient conditions (temperature, humidity, etc.), and activate the heating elements 30 (or the temperature/flow of fluid through piping 28) if there is likelihood of ice accumulation on the charging interface 14. In some embodiments, the control system 70 may also monitor the operating conditions (speed, distance/time to next charging event) of the bus 10 and activate and/or control the heating elements 30 to prevent ice on the charging interface 14 at the next charging event. In some embodiments, the heating elements 30 may be activated when a humidity sensor 74 indicates the presence of moisture on the charging interface 14, and temperature sensor 72 indicates that the moisture is likely to freeze on the charging interface 14 before the next charging event. Although FIG. 4B illustrates the temperature sensor 72 and the humidity sensor 74 as being positioned on the charging interface 14, this is only exemplary. In general, the humidity sensor 74 and the temperature sensor 72 may be positioned anywhere on bus 10.

In some embodiments, the control system 70 may activate the heating elements 30 a predetermined time prior to a charging event. In some embodiments, the control system 70 may receive a signal indicative of a future (or next) charging event as the bus 10 approaches a charging station 50. Upon receipt of this signal, the control system 70 may activate the heating elements 30. In some embodiments, a sensor 76 on the bus 10 (or the charging station 50) may alert the control system 70 of an approaching charging event. In some embodiments, a global positioning system (GPS) or other geolocation system (e.g., cell tower triangulation) may be used to activate the heating elements 30.

In addition to, or as an alternative to, activating the heating elements 30 upon the detection of ice on the charging interface 14, in some embodiments, the heating elements 30 may be activated based on when the windshield wiper of the bus is activated. For example, the heating elements 30 may be activated when the ambient temperature is below a predetermined threshold value (for example, 32° F., 42° F., etc.) and the wiper is activated. The heating elements 30 may be deactivated when the temperature exceeds a threshold value and/or when wiper is deactivated. In some embodiments, the heating elements 30 may be deactivated only a predetermined time (5, 10, 15, 20, etc. minutes) after the wiper is deactivated. Activating the heating elements 30 based on wiper activity may assist in clearing falling snow or ice from the charging interface 14. In some embodiments, the heating elements 30 may be activated during initial startup of the bus 10 when the ambient temperature is below a threshold value.

In some embodiments, the heating elements 30 may operate on an on/off duty cycle to optimize energy consumption. The period of time the heating element 30 remains on (and off) may be adjusted in real time or may be preselected. In some embodiments, based on ambient conditions (such as, when the temperature is below a predetermined value and/or in the presence of moisture), the control system 70 may direct a first power level to the heating elements 30 to heat the charging station 14 to a first temperature. And, at a predetermined time before a charging event (or when a next charging event is detected), the control system 70 may increase the power level to a second power level to heat the charging interface 14 to a second temperature higher than the first temperature, and melt the accumulated snow/ice on the charging interface 14. Alternatively or additionally, inputs such as vehicle speed (e.g., a vehicle may be driving slower under rainy or icy conditions), vehicle windshield wiper state (e.g., whether the windshield wipers are on/off, or a speed setting of the windshield wipers) along with defroster state (e.g., on/off and defroster intensity) may also be used to trigger heating.

Although the control of heating element 30 of FIG. 4A is described above, the control concepts described above are equally applicable to regulating the temperature/flow of fluid through piping 28 of FIG. 3A. In general, the control systems 60, 70 detects freezing of the charging interface 14

(that is, detects the presence of ice on the charging interface 14, or the likelihood of ice formation on the charging interface 14) and activates and/or regulates the heating system (heating elements 30 or temperature/flow of heated fluid through piping 28) to remove or prevent such freezing. In some embodiments, in addition to the fluid piping 28 or the heating elements 30, one or more air jets (not shown) may be provided on the charging interface to blow snow and ice off of the charging interface 14.

The heating elements 30 may include any electrically resistive metal, such as, for example, tantalum or tungsten. In some embodiments, the heating elements 30 may be embedded in the landing surface 18 (or another surface of charging interface 14), while in other embodiments, heating elements 30 in the form of a tape or a roll may be attached to the landing surface 18 or another surface. In some embodiments, one or more heating elements 30 may be positioned proximate (such as, for example, under or adjacent to) an electrode of the charging blade 16. FIG. 5A illustrates an embodiment of the charging blade 16 with a heating element 60 positioned below pilot electrode 16c and FIG. 5B illustrates an embodiment of the charging blade 16 with a heating element 60 positioned adjacent to the pilot electrode 16c. Heating elements 30 may also be similarly located proximate other electrodes (16a, 16b, and 16d) of the charging blade 16. In some embodiments, the high voltage that exists between electrodes 16a, 16b, and 16c (and their respective mating electrodes on charging head 52) during charging may melt the ice from these electrodes without the need for external heating. However, since a low voltage contact exists between the pilot electrode 16c and its mating electrode on charging head 52, the presence of a heater proximate this electrode may be advantageous.

Figures 6A, 6B:
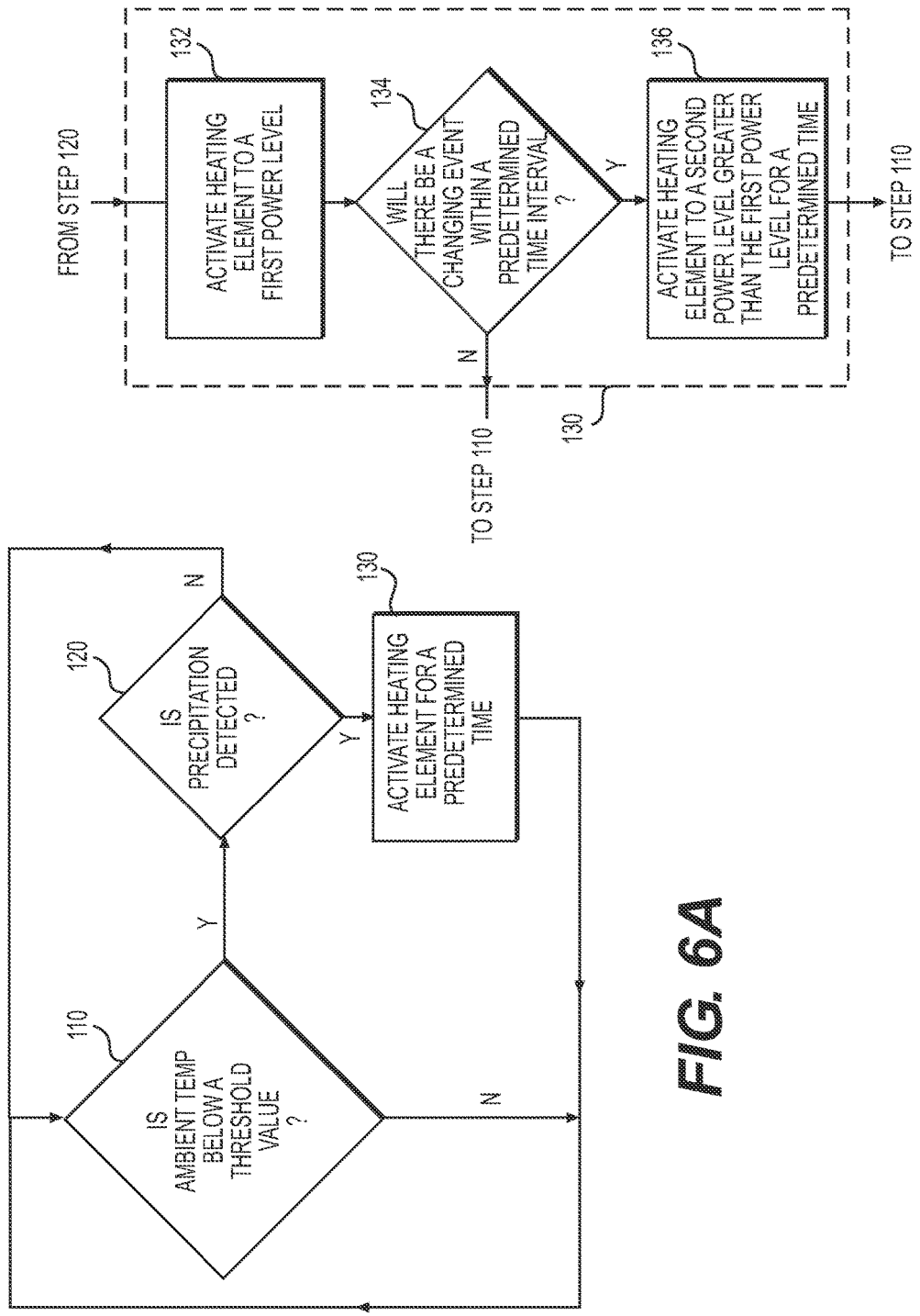
FIGS. 6A-6D are illustrations of exemplary methods of operating the charging interface of the bus of FIG. 1.

FIG. 6A illustrates an exemplary method of heating a charging interface 14 with heating elements 30 positioned on the charging interface 14. When the ambient temperature is below a predetermined value (for example, below freezing temperature) (step 110), and precipitation is detected on the charging interface 14 (step 120), the heating element 30 is activated for a predetermined time (step 130) to melt the accumulated snow and ice on the charging interface 14. The predetermined time may be time needed for the accumulated ice to melt, and may be determined based on prior experience or experimentation.

In some embodiments, step 130 of FIG. 6A may be replaced with the steps illustrated in FIG. 6B. That is, when the ambient temperature is below a predetermined value (step 110), and when precipitation is detected on the charging interface 14 (step 120), the heating element 30 is heated using a first power level to preheat the charging interface 14 to a first temperature (step 132). Then, when an imminent charging event is detected (such as, from sensor 76 of FIG. 4B), the heating element 30 may be heated using a second power level (greater than the first power level) to heat the charging interface to a second temperature (higher than the first temperature) and melt the accumulated snow and ice. After a predetermined time at the second power level, the heater may be turned off.

Figure 6C:
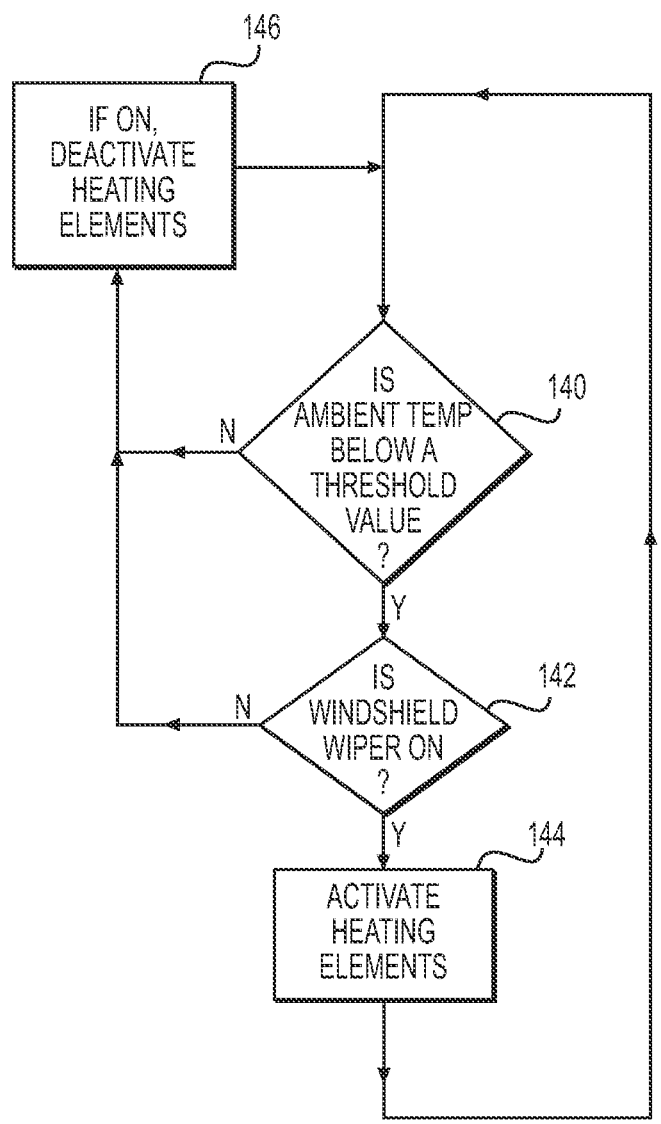

FIG. 6C illustrates another exemplary method of heating the charging interface 14. In this embodiment, when the ambient temperature is below a threshold value (for example, ≤32° F., 42° F., etc.) (step 140), and the windshield wiper of bus 10 is on (step 142), the heating element 30 may be activated (step 144). The heating element 30 may then be deactivated when the temperature exceeds the predetermined value (the same or another predetermined value) or when the wiper is deactivated (step 146). In some embodiments, the heating element 30 will be deactivated (that is, step 146) only a predetermined time after the ambient temperature increases above the predetermined value (step 140) or a predetermined time after the windshield wiper is deactivated (step 142).

Figure 6D:
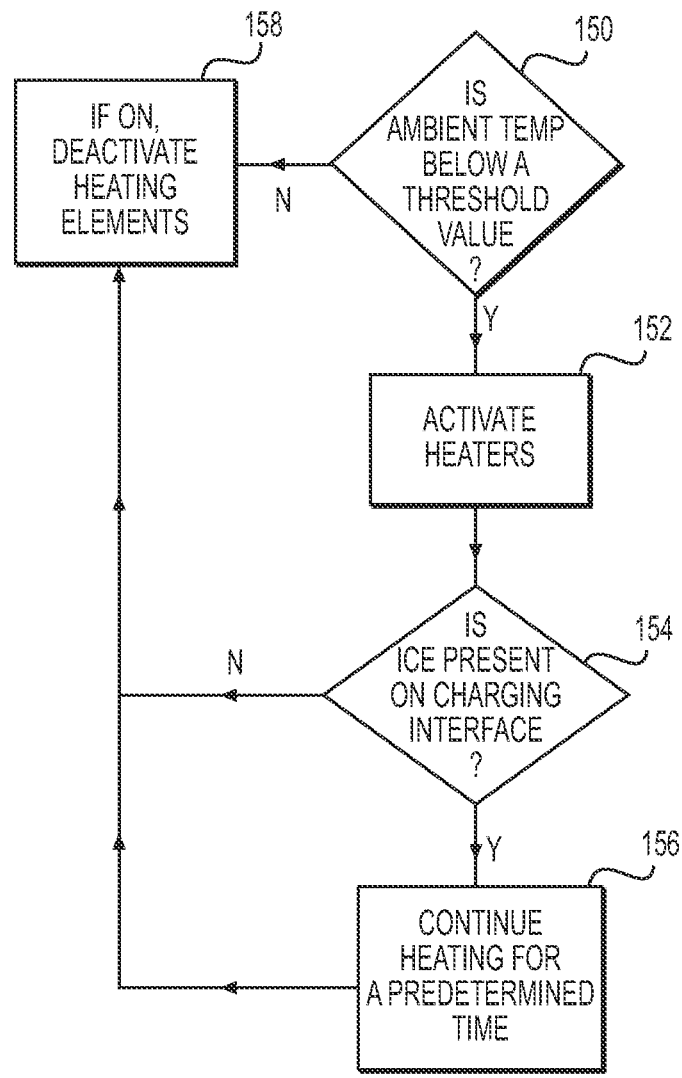

FIG. 6D illustrates another exemplary method of heating the charging interface 14. In this embodiment, the heating elements 30 may be activated (step 152) when the ambient temperature is below a threshold value (step 150). The control system 70 may then determine if accumulated ice is present on the charging interface (step 154). As described previously, the control system 70 may detect the presence of accumulated ice on the charging interface 14 based on its weight increase, rate of temperature increase, etc. If accumulated ice is detected, heating of the charging interface 14 is continued for a predetermined time (step 156). If no ice is detected on the charging interface (step 154), the heating elements 30 are deactivated (step 158). In some embodiments, if ice is detected on the charging interface 14 (step 154), heating of the charging interface 14 may not be for a predetermined time but rather continued until the control system determines that a sufficient amount of the accumulated ice has melted. The control system 70 may determine that ice has melted based on the measured weight change, rate of temperature change, etc. of the charging interface 14.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

We claim:

1. An electric vehicle, comprising:
a charging interface on an external surface of the electric vehicle;
one or more electrodes on the charging interface;
a heating system attached to the charging interface and configured to heat at least a portion of the charging interface when the electric vehicle is in motion; and
a control system configured to (a) detect presence of accumulated ice or snow on the charging interface, and (b) selectively activate the heating system to heat the portion of the charging interface before the vehicle connects with the charging station, based at least on (i) the detection of accumulated ice or snow on the charging interface and (ii) a signal from the charging station indicative of an upcoming charging event.

2. The vehicle of claim 1, wherein the heating system includes one or more electrically resistive heating elements.

3. The vehicle of claim 2, wherein at least one heating element of the one or more heating elements is positioned under an electrode of the one or more electrodes.

4. The vehicle of claim 1, wherein the heating system includes a conduit configured to circulate a fluid heated by one or more heat producing components of the vehicle.

5. The vehicle of claim 1, wherein the control system is configured to detect the presence of accumulated ice or snow based at least on a rate of temperature change of the charging interface.

6. The vehicle of claim 1, wherein the control system is further adapted to activate the heating system when an ambient temperature is below a threshold value and a windshield wiper of the electric vehicle is on.

7. The vehicle of claim 1, wherein the electric vehicle is an electric bus and the charging interface is positioned on a roof of the bus.

8. The vehicle of claim 1, wherein the control system is configured to (a) heat the portion of the charging interface to a first temperature when accumulated snow or ice is detected on the charging interface, and (b) heat the portion to a second temperature higher than the first temperature if it is determined that the vehicle will connect with the charging station within a predetermined time interval.

9. A method of operating an electric vehicle, the electric vehicle including a charging interface with a heating system, the charging interface being configured to connect with a charging station to charge the electric vehicle, comprising:
monitoring an ambient temperature; and
activating the heating system when the electric vehicle is in motion to heat at least a portion of the charging interface before the vehicle connects with the charging station when the monitored ambient temperature is below a threshold value, wherein activating the heating system includes (a) heating the portion of the charging interface to a first temperature when the monitored ambient temperature is below the threshold value, (b) after heating the portion of the charging interface to the first temperature, operating the electric vehicle with the portion of the charging interface at the first temperature, and (c) when it is determined that the vehicle will connect with the charging station within a predetermined time interval, heating the portion of the charging interface to a second temperature higher than the first temperature.

10. The method of claim 9, further including determining if accumulated ice or snow is present on the charging interface, and deactivating the heating system based on the determination that accumulated ice or snow is not present.

11. The method of claim 10, wherein determining if accumulated ice or snow is present includes determining if accumulated ice or snow is present based on a rate of temperature change of the charging interface.

12. The method of claim 9, wherein activating the heating system includes activating the heating system when the ambient temperature is below the threshold value and when a windshield wiper of the electric vehicle is on.

13. The method of claim 9, wherein activating the heating system includes heating the portion using an electrically resistive heating element.

14. An electric bus, comprising:
a body having a roof;
a charging interface positioned on the roof, the charging interface being configured to connect with a charging station to charge the electric bus;
a heating system positioned on the charging interface and configured to heat at least a portion of the charging interface when the bus is in motion; and
a control system configured to detect the presence of accumulated snow or ice on the charging interface and selectively activate the heating system to heat the charging interface, before the bus connects with the charging station based at least on (a) the detection of accumulated snow or ice on the charging interface and (b) a distance of the bus from the charging station.

15. The bus of claim 14, wherein the heating system includes one or more electrically resistive heating elements.

16. The bus of claim 14, wherein the heating system includes a conduit with fluid heated by cooling at least one of an electric motor or an inverter.

17. The bus of claim 14, wherein the control system is further configured to activate the heating system when an ambient temperature is below a threshold value and a windshield wiper of the bus is on.

18. The bus of claim 14, wherein the control system is configured to detect the presence of snow or ice on the charging interface based on a rate of temperature change of the charging interface.

19. The bus of claim 14, wherein the control system is configured to (a) heat the charging interface to a first temperature when accumulated snow or ice is detected on the charging interface, and (b) heat the portion to a second temperature higher than the first temperature if it is determined that the vehicle will connect with the charging station within a predetermined time interval.

* * * * *